United States Patent [19]
Gregorich et al.

[11] Patent Number: 5,289,046
[45] Date of Patent: Feb. 22, 1994

[54] POWER CONVERTER WITH CONTROLLER FOR SWITCHING BETWEEN PRIMARY AND BATTERY POWER SOURCES

[75] Inventors: James M. Gregorich, Merrimack, N.H.; James A. Daly, Chelsea, Mass.; Gerald J. Brand, Derry, N.H.

[73] Assignee: Digital Equipment Corporation, Maynard, Mass.

[21] Appl. No.: 896,250

[22] Filed: Jun. 10, 1992

[51] Int. Cl.5 ............................................. H02J 7/00
[52] U.S. Cl. ............................... 307/66; 307/64; 323/207; 323/285; 363/86
[58] Field of Search .................. 307/64, 66; 363/86, 363/89, 125; 323/202, 222, 282, 284, 285, 299, 351

[56] References Cited

U.S. PATENT DOCUMENTS

| | | | |
|---|---|---|---|
| 4,465,943 | 8/1984 | Risberg | 307/67 |
| 5,001,620 | 3/1991 | Smith | 363/89 |
| 5,111,058 | 5/1992 | Martin | 307/66 |
| 5,138,184 | 8/1992 | Keefe | 307/64 |

OTHER PUBLICATIONS

Joos, et al., *An On-Line Ups With Improved Input-Output Characteristics*, IEEE (1992) pp. 598–605.
Campos et al., *Ups System Employing High Frequency PWM Techniques*, IEEE (1990) pp. 414–421.

*Primary Examiner*—Jeffrey A. Gaffin
*Attorney, Agent, or Firm*—Cesari and McKenna

[57] ABSTRACT

A power converter, based on a modular architecture, in which a boost power factor correction circuit is provided as an input stage for both a primary power source and a battery power source. This arrangement permits the same power conversion stages which follow the boost power factor correction circuit to be used regardless of whether the primary or battery power source is in use. The power supply includes a controller for monitoring the primary power source voltage and the DC voltage produced at the output of the boost circuit and comparing each to a preselected reference. When a sufficiently large difference appears between each of those voltages and its respective reference, the controller connects the battery power source to the input of the boost circuit and simultaneously disconnects the primary power source therefrom. This switching of power sources is transparent to the load whose input voltage is maintained at a substantially constant level by the boost power factor correction circuit.

14 Claims, 3 Drawing Sheets

POWER CONVERTER WITH CONTROLLER FOR SWITCHING BETWEEN PRIMARY AND BATTERY POWER SOURCES

BACKGROUND OF THE INVENTION

1. Field of the Invention

The present invention relates generally to the field of "uninterruptable" power supplies and, more specifically, to an uninterruptable power supply which includes an apparatus for controlling the application of a primary power source and a battery power to a load.

2. Discussion of the Prior Art

Many types of electronic equipment are powered by batteries to achieve desired functionality. In smaller equipment, such as laptop computers, it is often desirable to use a battery power supply for portability. Larger equipment, such as a "minicomputer" or mainframe computer, may rely on a battery power source as a back-up which is switched on-line during a failure in a primary power source (i.e., the local electric utility). Such "uninterruptable" power supplies are thus intended to maintain a continuous supply of power in order to prevent or reduce down time of costly, critical equipment and also prevent loss of data during interruptions of utility supplied power.

A conventional uninterruptable power supply is connected to an AC primary power source, sometimes referred to herein as the "line." If the load served by the power supply requires DC as well as AC voltage, then the power supply includes one or more rectifiers to produce a DC voltage. The power supply also typically includes an array of batteries connected together to form a back-up power source capable of delivering sufficient current to power the load for a short time period. Finally, one or more power conversion stages are usually provided to convert the AC line voltage or rectified line voltage (or DC battery voltage) to appropriate levels for the load. Such conversion stages may also perform filtering or regulation functions. One type of conversion stage, known as an inverter, may be used to convert a rectified line voltage or DC battery voltage to a regulated and filtered AC voltage which is suitable for application to the load.

Conventional uninterruptable power supplies exhibit several disadvantages, however. One major disadvantage is that a separate battery power conversion stage is often required to convert the DC voltage produced by the battery power source to appropriate AC or DC levels for the load. This battery power conversion stage is costly to implement, yet little used, since it is needed only during presumably short, infrequent failures of the primary power source. Moreover, the presence of the battery power conversion stage adds to the packaging volume of the power supply and may interfere with or prevent the attainment of other design objectives such as "modularity" (i.e., the ability to construct the power supply from discrete units having common interfaces).

A conventional alternative arrangement to providing a battery power conversion stage is to connect the battery power source directly to a DC bus, which in turn is connected to the power conversion stages which normally receive the rectified line voltage. The major disadvantage of this arrangement is that the inputs of the power conversion stages directly sourced by the batteries must be designed to accommodate input voltages which typically vary over large dynamic ranges. This is due to the fact that the magnitude of the voltage produced by the battery power source varies significantly as the batteries discharge. Again, such power conversion stages tend to be more expensive to implement than those with a more limited input range and also tend to adversely affect other design objectives.

SUMMARY OF THE INVENTION

In brief summary, the present invention provides an power converter, based on a modular architecture, in which a boost power factor correction (PFC) circuit is provided as an input stage to all subsequent power conversion stages. The boost PFC circuit receives either a rectified line voltage or a DC voltage produced by a battery power source. This arrangement permits the same power conversion stages which follow the boost PFC circuit to be used regardless of whether the line or the battery power source is in use. As a result, the present invention eliminates the need for a separate battery power conversion stage as well as the need for a DC bus. Further, since the boost PFC circuit is capable of handling input voltages which vary over a wide dynamic range, the battery power source may be utilized more efficiently to provide a longer period of battery operation.

The power supply includes control circuitry for monitoring the AC line voltage and the DC voltage produced at the output of the boost PFC circuit and comparing each to a preselected reference. When a sufficiently large difference appears between each of those voltages and its respective reference, the controller connects the battery power source to the input of the boost PFC circuit and simultaneously disconnects the line therefrom. This switching of power sources is transparent to the load, whose input voltage is maintained at a substantially constant level by the boost PFC circuit.

Subsequently, if the line voltage rises to a sufficient level in comparison with its reference, the controller disconnects the battery power source from the boost PFC circuit and reconnects the line.

BRIEF DESCRIPTION OF THE DRAWINGS

This invention is pointed out with particularity in the appended claims. The above and further advantages of this invention may be better understood by referring to the following description taken in conjunction with the accompanying drawings, in which:

DETAILED DESCRIPTION OF AN ILLUSTRATIVE EMBODIMENT

Figure 1:
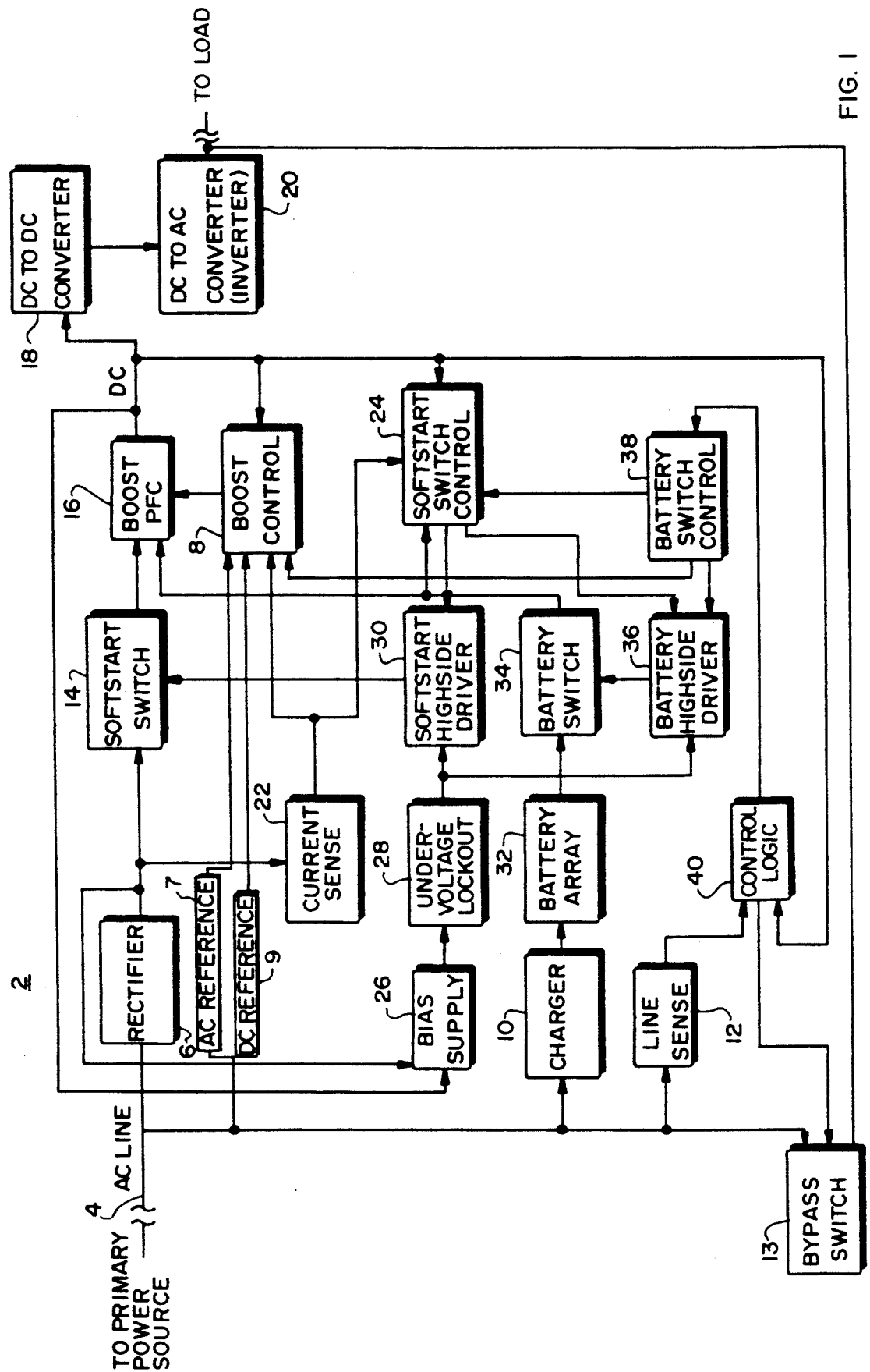
FIG. 1 is a block diagram of a power converter which includes a controller constructed in accordance with a preferred embodiment of the present invention.

FIG. 1 shows a power converter 2 which operates to a maintain a substantially continuous supply of power to a desired load. A primary power source, typically the local electric utility, is connected at an input 4, which is referred to herein as the "AC line" or simply "line." The AC line is connected to a rectifier 6, an AC reference 7, a battery charger 10, a line sense circuit 12 and a bypass switch 13. The boost control circuit 8 is connected to a DC reference 9.

An output of the rectifier 6 is connected to a softstart switch 14, whose output in turn is connected to a boost power factor correction (PFC) circuit 16. The boost PFC circuit 16 is connected to the boost control circuit 8 and to a DC to DC converter 18, whose output is connected to a DC-to-AC converter or inverter 20. The output of the inverter 20 is normally connected to a load.

The output of rectifier 6 is also connected to a current sense circuit 22 whose output is connected to both the boost control circuit 8 and to a softstart switch control circuit 24. A bias supply 26 is connected to an under-voltage lockout circuit 28 as well as the output of the rectifier 6 and the output of the boost PFC circuit 16. A softstart highside driver 30 is connected to the outputs of the under-voltage lockout circuit 28 and the softstart switch control circuit 24 and also to the softstart switch 14.

A battery array 32 is connected to a battery switch 34 and to the output of the battery charger 10. The battery switch 34 is also connected to the boost PFC circuit 16. A battery highside driver 36, whose output is connected to the battery switch 34, is connected to the outputs of the softstart switch control circuit 24, the under-voltage lockout circuit 28, and a battery switch control circuit 38. Control logic 40, which is connected to the battery switch control circuit 38 and the bypass switch 13, is connected to the outputs of the line sense circuit 12 and the boost PFC circuit 16.

The rectifier 6, line sense circuit 12, switches 13, 14 and 34, converters 18 and 20, and current sense circuit 22 represent conventional circuitry whose designs and functions are well understood by those skilled in the art. Bias supply 26, which provides DC bias voltage for the circuitry shown in FIG. 1, the battery charger 10 and battery array 32 are also of conventional design.

The under-voltage lockout circuit 28 monitors the DC voltage produced by the bias supply 26. If the bias supply 26 becomes overloaded or malfunctions and the bias voltage drops sufficiently low, the circuit 28 "locks out" or disables both highside drivers 30 and 36, thereby rendering the entire power converter 2 inoperable.

The boost PFC circuit 16 is preferably of the type described in copending application entitled "High Power Factor Switched DC Power Supply," filed on Jun. 10, 1992, Ser. No. 07/896,256, assigned to the assignee of the present application and incorporated herein by reference.

The basic operating modes of the power converter 2, which are invoked by the control logic 40, will now be described. In a first or "normal" operating mode, sufficient voltage is available from the primary power source. The softstart switch 14 is closed, thereby coupling the output of rectifier 6 to the boost PFC circuit 16. The battery switch 34 is open so that the battery array 32 is decoupled from the boost PFC circuit 16.

The softstart switch control 24, through the current sense circuit 22, monitors the magnitude of the current flowing into the softstart switch 14 and, in response, turns the softstart highside driver 30 on or off. In this fashion, excessive current from the rectifier 6 is controlled, thus preventing over-current to various circuit components.

During this mode of operation, the boost control circuit 8 continuously monitors the DC output of the boost PFC circuit 16. The boost control circuit 8 compares the magnitude of the voltage at the output of the boost PFC circuit 16 to an internal reference to produce an error signal, which is multiplied by a voltage produced by the AC reference 7 to in turn produce a control signal having the same waveform as that of the AC line. That control signal is applied to the boost PFC circuit 16 which operates to boost the rectified line voltage to approximately 400 VDC while also correcting the power factor (i.e., making the average input current directly proportional to the input voltage).

Should a failure occur at the primary power source, the control logic 40 detects a drop in the DC voltage produced at the output of the boost PFC circuit 16. If that DC voltage drops below a preselected threshold and, contemporaneously, the line sense circuit 12 detects that the AC line voltage has dropped below a preselected threshold, the control logic 40 responds by transmitting a signal to the battery switch control circuit 38 to initiate a transfer to a second or "battery" mode of operation to avoid an interruption of power delivered to the load.

In response to the transfer signal from the control logic 40, the battery switch control 38 enables the battery highside driver 36, which in turn causes the battery switch 34 to close, thereby coupling the battery array 32 to the boost PFC circuit 16. Simultaneously, the battery switch control circuit 38 transmits a signal to the softstart switch control 24, which responds by causing the softstart highside driver 30 to open the softstart switch 14, thereby decoupling the rectifier 6 from the boost PFC circuit 16. In addition, the battery switch control circuit 38 transmits a signal to the boost control circuit 8 which causes that circuit to select the DC reference 9 for use during the battery mode of operation. The separate DC reference 9 for the battery mode of operation is necessary because the AC reference 7 either provides an AC demand current from the primary power source or zero demand current in the absence of AC power, while the battery requires a DC demand current.

A third or "bypass" mode of operation is invoked when the control logic 40 senses a significant drop in the DC output of the boost PFC circuit 16, but no significant drop in the AC line voltage. Under such conditions, it is assumed that a malfunction exists somewhere within the power converter 2 and control logic 40 responds by closing bypass switch 13 to permit direct application of the AC line to the load. Simultaneously, control logic 40 causes switch controls 24 and 38 to open the switches 14 and 34, respectively, so that the output of the boost PFC circuit 16 drops to zero.

Figure 2:
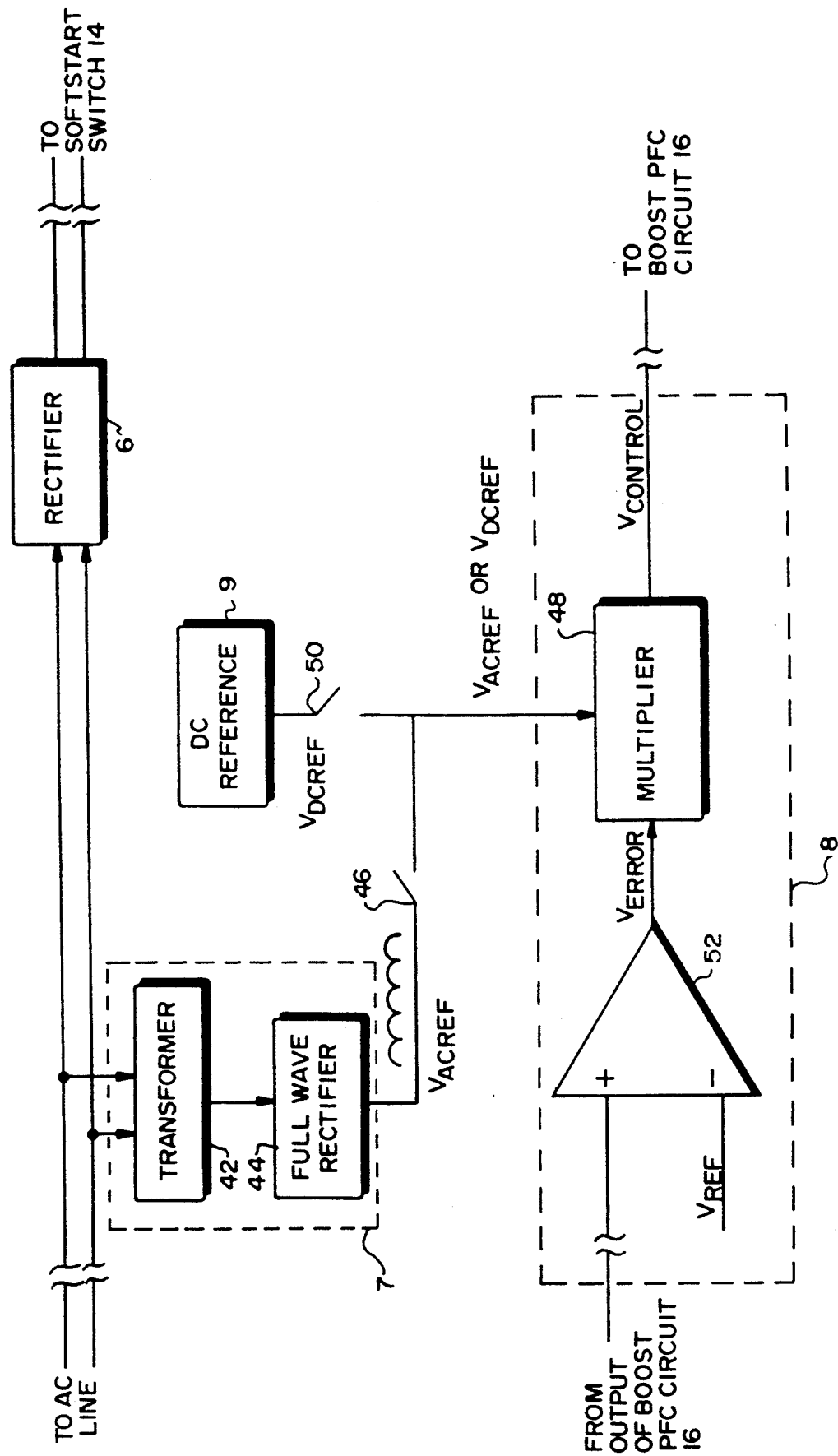
FIG. 2 is a detailed diagram of the AC and DC references and boost control circuit shown in FIG. 1.

Turning now to FIG. 2, AC reference 7 includes a transformer 42 which is connected between the AC line and a full wave rectifier 44. A switch 46 is operable to connect the rectifier 44 to a multiplier 48. A switch 50 is operable to connect the DC reference 9 to the multiplier 48.

An error amplifier 52 compares the magnitude of the voltage produced at the output of the boost PFC circuit 16 (FIG. 1) with a reference voltage $V_{REF}$. The output signal produced by the error amplifier 52, $V_{ERROR}$, multiplies or adjusts the magnitude of either $V_{ACREF}$ or $V_{DCREF}$, depending upon which switch 46 or 50 is closed. The output of the multiplier or automatic gain control (AGC) circuit 48 is a control signal $V_{CONTROL}$, which is applied to control the pulse width modulator of the boost PFC circuit 16.

During the normal mode of operation previously described, switch 46 is closed and switch 50 is open, meaning that $V_{ACREF}$ is applied to the multiplier (AGC circuit) 48. The magnitude of $V_{ACREF}$ is adjusted (multiplied) by $V_{ERROR}$. As a result, the waveform of $V_{CONTROL}$ closely tracks the waveform present on the AC line, thus enabling the boost PFC circuit 16 to properly correct the power factor.

During the battery mode of operation, switch 46 is open, switch 50 is closed and $V_{CONTROL}$ becomes the product of $V_{DCREF}$ and $V_{ERROR}$.

Figure 3:
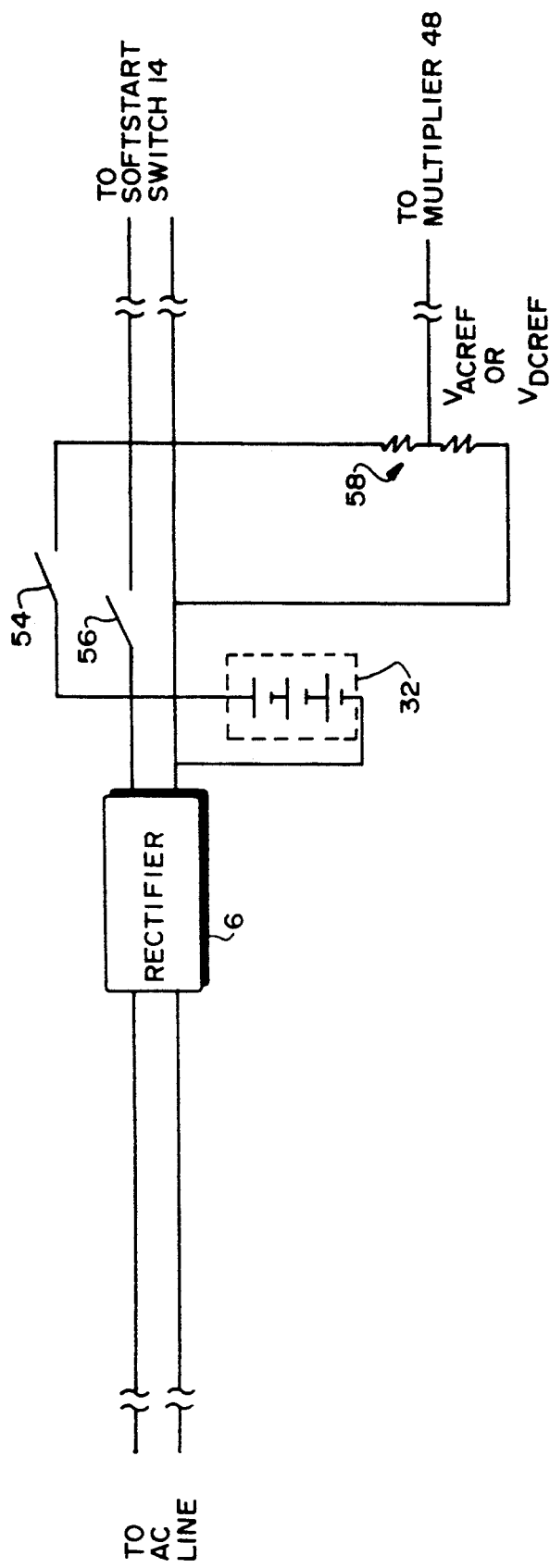
FIG. 3 is an alternative embodiment of the circuitry depicted in FIG. 2.

FIG. 3 shows an alternative circuit for the AC and DC references of FIG. 2. In this arrangement, a switch 56 is operable to connect the rectifier 6 to the softstart switch 14. A switch 54 is operable to connect the battery array 32 (FIG. 1) to the softstart switch 14. A voltage divider 58, connected across the output of the rectifier 6, generates the reference voltage $V_{ACREF}$ or $V_{DCREF}$ which is applied to the multiplier 48 of FIG. 2. During the normal mode of operation, when power is supplied by the AC line, switch 54 is open (thus disconnecting the battery array 32), switch 56 is closed and $V_{ACREF}$ is produced by the voltage divider 58. During the battery mode of operation, switch 54 is closed, switch 56 is open, and $V_{DCREF}$ is produced by the voltage divider.

Figure 4:
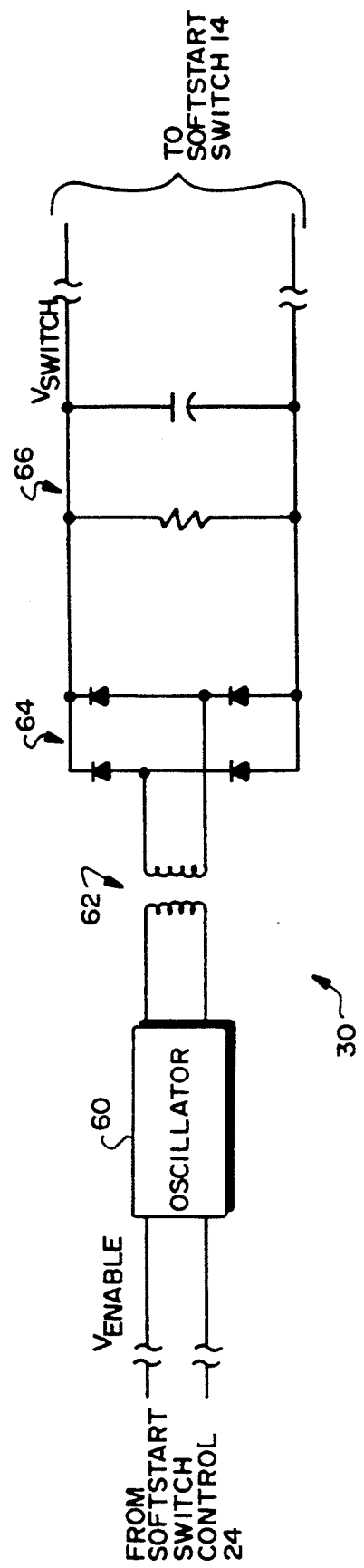
FIG. 4 is a detailed diagram of the softstart highside driver shown in FIG. 1.

FIG. 4 shows the softstart highside driver 30 of FIG. 1, which includes an oscillator 60, an isolation transformer 62, a rectifier 64 and a filter 66. A control signal $V_{ENABLE}$, which is supplied by the softstart switch control circuit 24, serves to turn the oscillator 60 on or off. The output signal of the oscillator 60, which is preferably a 1MHZ rectangular voltage wave, is applied via the transformer 62 to the rectifier 64. The rectified signal is smoothed by filter 66 and applied to the softstart switch 14 as $V_{SWITCH}$. $V_{SWITCH}$ serves to rapidly open and close the softstart switch 14, thereby controlling the magnitude of current entering the boost PFC circuit 16 as described previously.

It should be understood that the battery highside driver 36 of FIG. 1 may be implemented with a circuit similar to that shown for the softstart highside driver 30 of FIG. 4.

The foregoing description has been limited to a specific embodiment of this invention. It will be apparent, however, that variations and modifications may be made to the invention, with the attainment of some or all of the advantages of the invention. Therefore, it is the object of the appended claims to cover all such variations and modifications as come within the true spirit and scope of the invention.

What is claimed as new and desired to be secured by Letters Patent of the United States is:

1. In a power supply, an apparatus for controlling the selection of a primary power source or a battery power source for powering a load, said apparatus comprising:
   means having an input connected to receive AC voltage from said primary power source for rectifying said AC voltage;
   first switch means for alternately connecting or disconnecting said rectifying means from an input of a boost power factor correction means in response to a first switch control signal, said boost power factor correction means for adjusting the power factor of a voltage received at its input in response to a boost control signal and producing at an output a regulated DC voltage;
   a battery power source comprising one or more batteries;
   second switch means for alternately connecting or disconnecting said battery power source from said boost power factor correction means in response to a second switch control signal; and
   control means, coupled to the first and second switch means and the boost power factor correction means, for comparing the magnitude of said regulated DC voltage to a first preselected reference and generating an output error signal indicative of the difference therebetween, for comparing the magnitude of the AC voltage from the primary power source to a second preselected reference and generating an input error signal indicative of the difference therebetween and for generating the first and second switch control signals in response to said error signals, whereby either said rectifying means or said battery power source is connected to said boost power factor correction means, and for generating said boost control signal.

2. The apparatus as in claim 1 further comprising a bias supply for providing DC bias voltage said apparatus and means for rendering said apparatus inoperative when said bias voltage falls below a predetermined threshold.

3. The apparatus as in claim 1 further comprising a bypass switch, responsive to said control means, for directly applying said primary power source to a load.

4. The apparatus as in claim 1 wherein said control means includes means for comparing said regulated DC voltage with a third preselected reference and generating a boost error signal indicative of the difference therebetween and for multiplying said boost error signal by a fourth preselected reference to produce said boost control signal.

5. The apparatus as in claim 4 wherein when said rectifying means is connected to the input of the boost power factor correction means, said fourth preselected reference is generated by a full wave rectifier connected to a secondary winding of a transformer whose primary winding is connected to the primary power source.

6. The apparatus as in claim 4 wherein when said battery power source is connected to the boost power factor correction means, said fourth preselected reference is generated by a DC reference circuit.

7. The apparatus as in claim 4 wherein said fourth preselected reference is generated by a voltage divider which is connected to receive said rectified AC voltage when said rectifying means is connected to the input of the boost power factor correction means, and which is connected to receive the DC voltage produced by said battery power source when said battery power source is connected to the boost power factor correction means.

8. The apparatus as in claim 1 wherein said control means includes an oscillator connected to the primary winding of a transformer, a rectifier connected to the secondary winding of said transformer and a filter connected to said rectifier for generating said first switch control signal.

9. The apparatus as in claim 1 wherein said control means includes an oscillator connected to the primary winding of a transformer, a rectifier connected to the secondary winding of said transformer and a filter connected to said rectifier for generating said second switch control signal.

10. In an uninterruptable power supply having normal and battery modes of operation, a method of controlling the selection of a primary power source or a battery power source for powering a load, said method comprising the steps of:

in the normal mode of operation, applying an AC voltage from a primary power source to a rectifier to produce a rectified voltage for application to an input of a boost power factor correction circuit, said circuit for producing a regulated DC voltage at an output;

comparing the magnitude of the AC voltage to a first preselected reference and generating a first error signal indicative of the difference therebetween;

comparing the magnitude of the regulated DC voltage to a second preselected reference and generating a second error signal indicative of the difference therebetween; and comparing the magnitudes of said first and second error signals to first and second preselected thresholds, respectively, whereby when the magnitudes of the error signals exceed the thresholds, the battery mode of operation is initiated wherein said battery power source is connected to deliver a DC voltage to the input of the boost power factor correction circuit and the primary power source is disconnected therefrom.

11. The method as in claim 10 wherein during either mode of operation said regulated DC voltage is compared with a third preselected reference to generate a boost error signal indicative of the difference therebetween and said boost error signal is multiplied by a fourth preselected reference to produce a boost control signal which is applied to said boost power factor correction circuit.

12. The method as in claim 11 wherein during the normal mode of operation, said third preselected reference is generated by a full wave rectifier connected to a secondary winding of a transformer whose primary winding is connected to the primary power source.

13. The method as in claim 11 wherein during the battery mode of operation, said third preselected reference is generated by a DC reference circuit.

14. The method as in claim 11 wherein said third preselected reference is generated by a voltage divider which is connected to receive said rectified voltage during the normal mode of operation and which is connected to receive the DC voltage produced by said battery power source during the battery mode of operation.

* * * * *